Dec. 23, 1930. G. HARDIE 1,785,901
CULTIVATOR
Filed Sept. 5, 1929 2 Sheets-Sheet 1
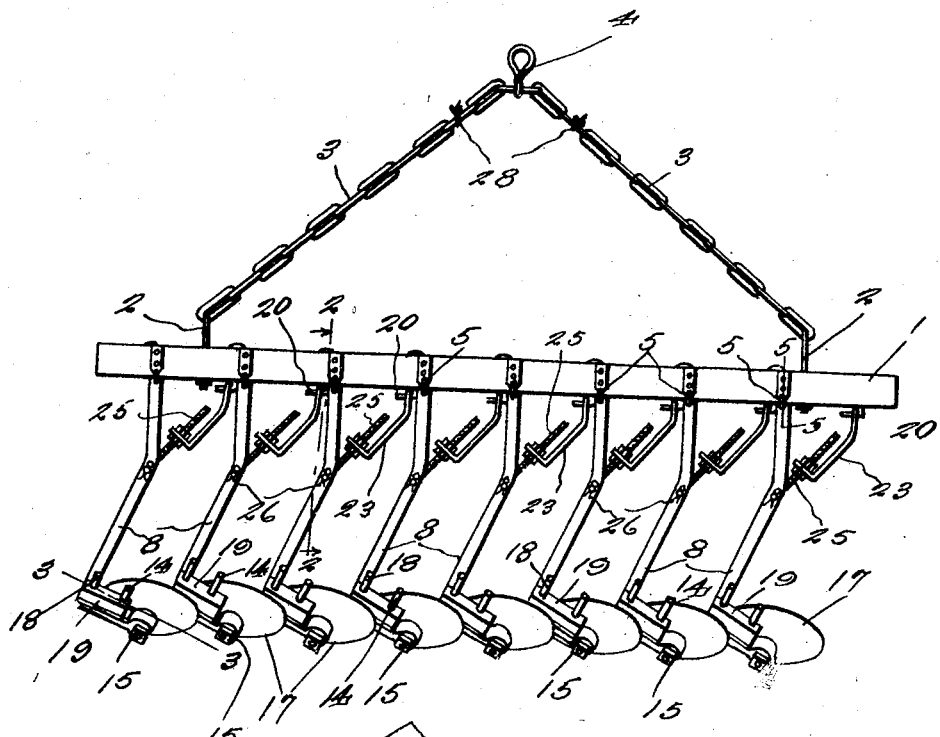
Fig. 1.
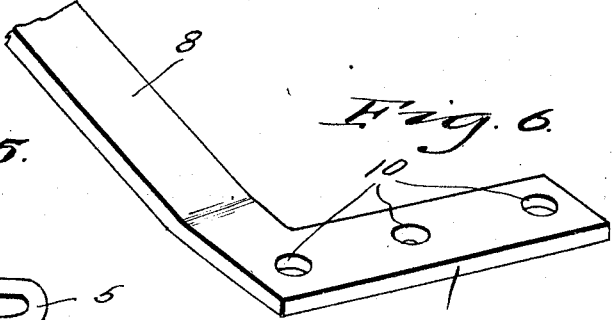
Fig. 5. Fig. 6.
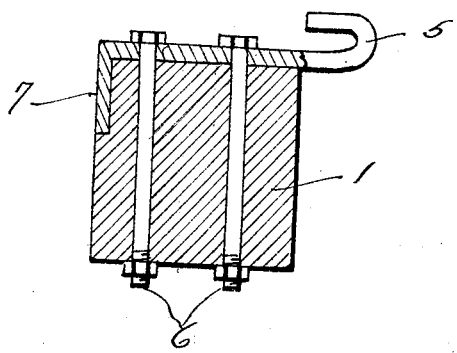
Inventor
George Hardie
By Clarence A. O'Brien
Attorney Dec. 23, 1930.    G. HARDIE    1,785,901
CULTIVATOR
Filed Sept. 5, 1929    2 Sheets-Sheet 2
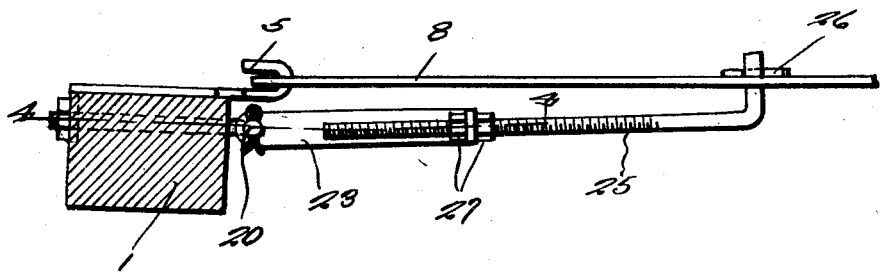
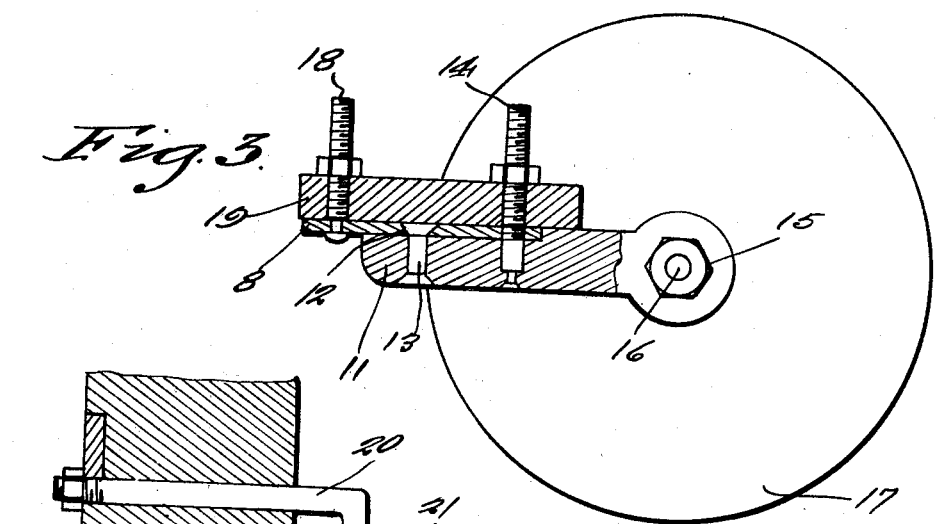
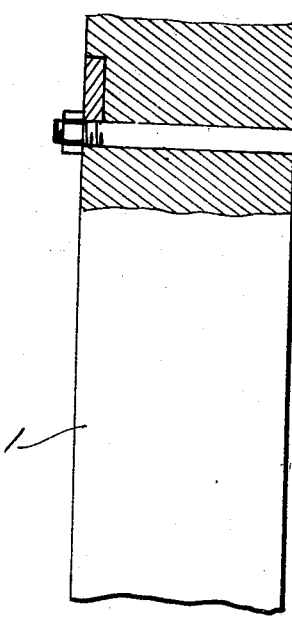
Inventor
George Hardie
By Clarence A. O'Brien
Attorney Patented Dec. 23, 1930

1,785,901

UNITED STATES PATENT OFFICE

GEORGE HARDIE, OF CONDON, OREGON

CULTIVATOR

Application filed September 5, 1929. Serial No. 390,517.

This invention relates to agricultural implements and more particularly to devices of this character of the disc cultivator type, and has for one of its objects to provide, in a manner as hereinafter set forth, an implement of the aforementioned type which is adapted for use as a pulverizer, mulcher, or weeder as well as for cultivating purposes.

Another object of the invention is to provide, in a manner as hereinafter set forth, a cultivator of the type mentioned embodying a gang of rotatable discs which are pivotally connected to a common beam and wherein means is provided for adjusting and maintaining said discs in their proper position with respect to each other.

A further object of the invention is to provide, in a manner as hereinafter set forth, a disc cultivator, wherein the discs are disposed substantially in the vertical plane and at right angles to the line of draft, thus effecting a scraping action on the soil to be treated.

A still further object of the invention is to provide a novel construction of draw bars for supporting each disc having provided thereon means for expeditiously mounting a plurality of weights thereon for exerting any desired degree of downward pressure on the disc when the implement is in use.

Still further objects of the invention are to provide an agricultural implement of the character set forth which will be simple in construction, strong, durable, efficient in its use, and which may be manufactured at low cost.

Other objects and advantages of the invention will be apparent from a study of the following specification, taken in connection with the accompanying drawings, wherein like characters of reference designate corresponding parts throughout the several views, and wherein:

Figure 1 is a top plan view of a cultivator constructed in accordance with this invention.

Figure 2 is a view in longitudinal section showing the means for adjustably connecting the draw bars to the beam.

Figure 3 is a view in vertical section of the means of securing weights adjacent the free ends of the drawbars.

Figure 4 is a view partly in section of the drawbar adjusting means.

Figure 5 is a detail view, partly in section, of the hook for connecting the drawbars to the beam, said beam being shown in section.

Figure 6 is a fragmentary detail in perspective of the free end of one of the drawbars.

Referring to the drawings in detail, the reference character 1 designates a beam, preferably of wood, and of any desired length and to which is secured, adjacent its opposite ends a pair of eye bolts 2. A pair of draft chains 3 are connected to the eye bolts 2 and converge forwardly to a point where they are connected to the draft hook 4 to which a double tree or any other suitable source of power may be attached.

Spaced laterally on the beam 1 and extending rearwardly therefrom are a plurality of hooks 5 which are secured to said beam by means of fastening elements 6 passing therethrough and which hooks 5 have their forward shank portions turned downwardly at right angles into engagement with the forward surface of the beam, as illustrated by the reference character 7. A plurality of draw bars 8 have their forward ends provided with openings for the reception of the hook 5, thus pivotally connecting said draw bars to the beam 1.

The draw bars 8 extend rearwardly at right angles to the beam 1 for a distance therefrom and are then turned laterally at an obtuse angle, as clearly illustrated in Figure 1. The free end portions of the draw bars are turned back at substantially right angles to the obtuse portion, as seen most clearly in Figure 6 of the drawings, said turned back portions being designated by the reference character 9.

The portions 9 of the draw bars are provided with longitudinally alined openings 10, the purpose of which will be presently set forth. A bracket or extension 11 is provided, on its upper face, with a rabbited portion 12 for the reception of the free end portion of the apertured turned back portion 9 of the drawbars. The bracket 11 extends longitudinally from the portion 9 of the drawbar and is connected thereto by means of a headed securing element 13 passing therethrough and the central opening 10 and by an elongated threaded element 14 which will be hereinafter more specifically described.

The free end of the bracket 11 terminates substantially in the longitudinal plane of the forward portion of the drawbars and is provided with an eye 15 through which extends a bearing bolt 16 for rotatably supporting a cultivator disc 17 on the free end of each of the drawbars 8. The securing element 14 is anchored in the bracket 11 and extends upwardly through the outermost opening 10 in the portion 9 of the drawbar. A threaded element 18 is anchored in the innermost opening 10 and terminates in the horizontal plane of the element 14.

A weight 19, or a plurality of weights, having spaced openings therethrough are adapted to be slipped over the threaded elements 14 and 18 for the purpose of exerting downward pressure on the discs 17 when it is desired to do so. The weights 19 are secured on the elements 14 and 18 by means of the nut 20. The foregoing is clearly illustrated in Figure 3 of the drawings.

For the purpose of adjusting and maintaining the earth working elements or discs 17 in the desired position, a plurality of substantially L-shaped hooks 20 are mounted in the beam 1 and extend rearwardly therefrom, as shown in Figure 4. A metallic strip 21 having an opening 22 adjacent its forward end for the reception of the hook 20 is provided with an obtusely directed portion 23 which terminates in a right angularly turned portion 24.

A threaded rod 25 extends through an opening in the portion 24 of the metal strip 21 and has its free end turned at right angles and extending through one of the draw bars 8. The bar 25 is retained in connected position with the draw bars 8 by means of a cotter pin 29 passing transversely through the free end portion thereof. A pair of adjusting nuts are mounted on the threaded portion of the bar 25 on opposite sides of the portion 24 of the strip 21 and embrace the same therebetween.

As seen in Figure 1 of the drawings the adjusting mechanism for each drawbar is disposed or anchored in the beam 1 at a point remote from that at which the drawbar is connected to the beam. It will be readily understood that by shifting the adjusting nuts, which are designated by the reference characted 27, longitudinally on the rod 25, said rod will be drawn forwardly or rearwardly through the angle portion of the strip 21, thus swinging the drawbars and discs in a horizontal plane on the beam 1.

It may sometimes be desired to shift the machine to a position at an angle with respect to the line of draft as a unit and this may be accomplished by simply shifting the draft hook 4 longitudinally on the draft chain 3. A pair of markers 28 in the form of any suitable wire are mounted at the desired point on the chain 3 to indicate the point at which to position the hook 4 when it is desired to cause the implement to be drawn over the ground at an angle to the line of draft.

As seen in the drawings, the discs 17, owing to the peculiar and novel configuration of the draw bars 8, are disposed substantially at right angles to the line of travel and are substantially concentric with the point of connection of their respective drawbars 8, at their point of connection with the beam 1. It will also be noted that the discs 17 are upwardly inclined, thus adapting the same to slide easily over the ground and any obstructions such as stones, which may be in their path.

It is believed that the many advantages of a cultivator constructed in accordance with this invention will be readily understood, and although the preferred embodiment of the invention is as illustrated and described, it is to be understood that the changes in the details of construction may be had which will fall within the scope of the invention as claimed.

What is claimed is:

1. An agricultural implement of the character described comprising an elongated beam, a plurality of drawbars pivotally connected to said beam in spaced relation, a rotatable earth working element mounted on the free end of each of the drawbars, and means connected to each of the drawbars at a point remote from the beam and to said beam for shifting said drawbars in a horizontal plane and for maintaining the same in their adjusted positions.

2. An agricultural implement of the character described comprising an elongated beam, a plurality of spaced rearwardly extending drawbars pivotally connected to said beam, earth working elements rotatably mounted on the free ends of each of said drawbars, apertured angle bars pivotally connected to the beam, threaded rods pivotally connected to the drawbars at a point remote from their point of connection with the beam, said rods extending through the apertures in the bars, and threaded adjusting elements mounted on said rod for shifting same longitudinally with respect to the apertured bars for swinging the drawbars in their horizontal plane on the beam.

3. An agricultural implement of the character described comprising a beam, outwardly and inwardly bent drawbars pivotally connected to the beam in spaced relation, earth working elements rotatably mounted on the free end of each of said drawbars, said earth working elements being disposed at right angles to the direction of travel of the implement and in substantially longitudinal alinement with the point of connection of their respective drawbars to the beam, and adjusting means connected to the drawbars and to the beam for swinging said drawbars in a horizontal plane on said beam.

4. An agricultural implement of the character described comprising an elongated beam, outwardly and inwardly bent rearwardly extending drawbars pivotally connected to said beam in spaced relation, a rotatable earth working disc connected to the free ends of the drawbars in substantially longitudinal alinement with their points of connection with the beam, spaced threaded vertically extending shanks mounted on the drawbars at their free ends, removable weights mounted on said shanks, and adapted to press the earth working elements downwardly, angular strips connected to the beam at one end and provided with apertures at their free ends, a threaded rod pivotally connected to each of the drawbars and extending through the aperture in each of the strips, adjusting nuts mounted on said rods and adapted to engage the free end portion of the strips in a manner to shift the rod longitudinally therethrough, and means connected to said beam for coupling the same to a draft mechanism.

In testimony whereof I affix my signature.

GEORGE HARDIE.